(12) United States Patent
Watarai (10) Patent No.: US 8,689,645 B2
(45) Date of Patent: Apr. 8, 2014

(54) BICYCLE CRANK ARM (75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 80 days.

(21) Appl. No.: 13/455,421

(22) Filed: Apr. 25, 2012

(65) Prior Publication Data

US 2013/0283969 A1 Oct. 31, 2013

(51) Int. Cl.
*G01L 1/00* (2006.01)

(52) U.S. Cl.
USPC .................................. 73/862.381; 73/862.391

(58) Field of Classification Search
USPC ........... 73/862, 27–862.31, 862.381, 862.391
See application file for complete search history.

(56) References Cited

U.S. PATENT DOCUMENTS

| | | | |
|---|---|---|---|
| 5,027,303 A | 6/1991 | Witte | |
| 7,585,257 B2 * | 9/2009 | Miyamaru et al. | 482/57 |
| 7,806,006 B2 * | 10/2010 | Phillips et al. | 73/862.338 |
| 7,861,599 B2 | 1/2011 | Meggiolan | |
| 8,006,574 B2 | 8/2011 | Meyer | |
| 8,065,926 B2 | 11/2011 | Meyer | |
| 2005/0178210 A1 | 8/2005 | Lanham | |
| 2007/0145709 A1 * | 6/2007 | Matsumoto | 280/259 |
| 2007/0261515 A1 * | 11/2007 | Jones | 74/594.1 |
| 2010/0263468 A1 | 10/2010 | Fisher et al. | |
| 2012/0017701 A1 | 1/2012 | Meyer | |

FOREIGN PATENT DOCUMENTS

| | | |
|---|---|---|
| JP | 3047816 U | 2/1998 |
| JP | 209-192385 A | 8/2009 |
| WO | WO-2011/030215 A1 | 3/2011 |

* cited by examiner

*Primary Examiner* — Max Noori
(74) *Attorney, Agent, or Firm* — Global IP Counselors (57) ABSTRACT A bicycle crank arm is provided with a crank body, a reference member and a sensor. The crank body has a crank axle mounting portion and a pedal mounting portion. The reference member is attached to the crank body. The sensor is attached to at least one of the crank body and the reference member. The sensor is arranged to output a signal based on a distance between the crank body and the reference member.

17 Claims, 6 Drawing Sheets

BICYCLE CRANK ARM

BACKGROUND

1. Field of the Invention

This invention generally relates to a bicycle crank arm. More specifically, the present invention relates to a bicycle crank arm with a sensor that detects a pedaling force.

2. Background Information

Bicycles are sometimes equipped with various sensors for providing information to the rider and/or for providing information to a controller to control various aspects of the bicycle such as shifting or suspension stiffness. One such sensor is a torque or force sensor for detecting a pedaling force of the rider. Various sensing arrangements have been proposed for detecting a pedaling force of the rider. For example, in U.S. Pat. No. 7,516,677 (assigned to Shimano Inc.), a cylindrical torsion-detecting sleeve member (force sensor unit) is provided on a crank axle for detecting a pedaling force applied to the crank axle during pedaling. Another example of a force sensor for detecting a pedaling force applied to a crank arm is disclosed in Japanese Utility Model Patent No. 3047816 (see FIGS. 3 and 4). In this utility model patent, a torque sensor is used to detect a relative resistance between a flexible rod and a crank arm. The crank arm and the flexible rod are rotatable around a crank axle via a one-way clutch bearing. A free end of the flexible rod contacts a portion 12 of the crank arm.

More recently, strain gauges have been used to detect a pedaling force during pedaling. For example, a force sensor is disclosed in U.S. Patent Application Publication No. 2010/0282001 (assigned to Shimano Inc.), which utilizes a strain gauge for detecting a pedaling force applied to a crank axle during pedaling. Another example is disclosed in U.S. Pat. No. 8,006,574 where a strain gauge is used on a crank arm to detect a pedaling force by a rider. Typically, the strain gauge needs to be installed with a high accuracy to obtain accurate measurements. Thus, the manufacturing costs and/or manufacturing time in manufacturing a bicycle crank arm increases when a strain gauge is installed thereon to detect a pedaling force by a rider.

SUMMARY

Generally, the present disclosure is directed to a bicycle crank arm that is provided with a sensing arrangement that detects a pedaling force or power being applied on bicycle the crank arm.

In one embodiment, a bicycle crank arm is provided that basically comprises a crank body, a reference member and a sensor. The crank body has a crank axle mounting portion and a pedal mounting portion. The reference member is attached to the crank body. The sensor is attached to at least one of the crank body and the reference member. The sensor is arranged to output a signal based on a distance between the crank body and the reference member.

With this bicycle crank arm, a more simple structure for detecting the power on the bicycle crank arm than with a bicycle crank arm using a strain gauge that needs high accuracy to assemble. Additional inventive features, objects, aspects and advantages of the disclosed bicycle crank arm will become apparent to those skilled in the bicycle field from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
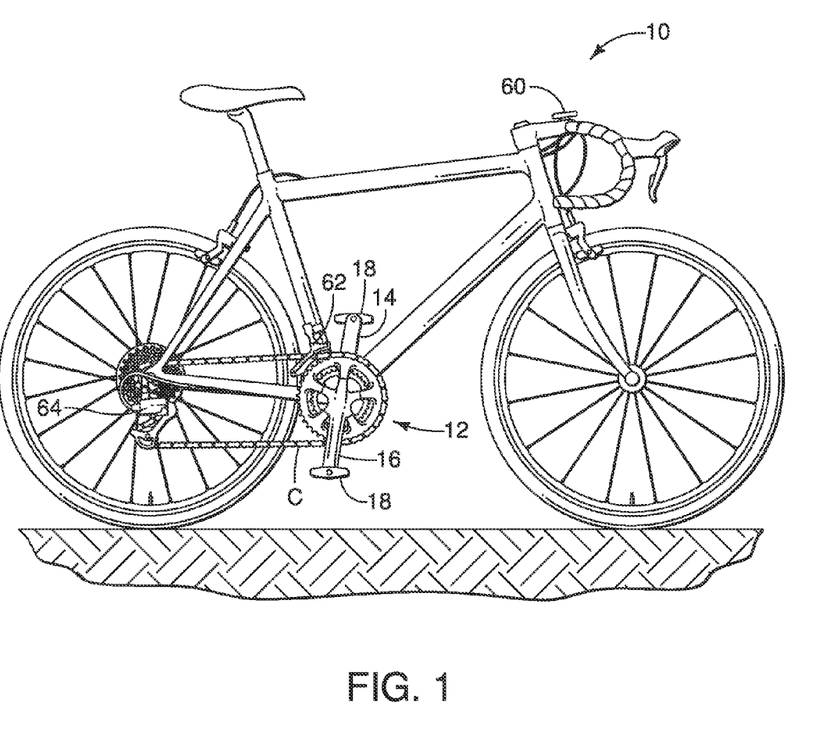
FIG. 1 is a side elevational view of a bicycle that is equipped with a bicycle crank assembly having a pair of bicycle crank arms in accordance with a first embodiment.

Referring to initially to FIG. 1, a bicycle 10 is illustrated that includes a bicycle crank axle assembly 12 having a first (left) bicycle crank arm 14 in accordance with a first embodiment. The bicycle crank axle assembly 12 further includes a second (right) crank arm 16. The free ends of the bicycle crank arms 14 and 16 are each provided with a bicycle pedal 18. A cyclist applies a pedaling force on the bicycle pedals 18 with is transmitted to the bicycle crank arms 14 and 16 for moving a bicycle chain C to propel the bicycle 10 in a conventional manner.

Figure 2:
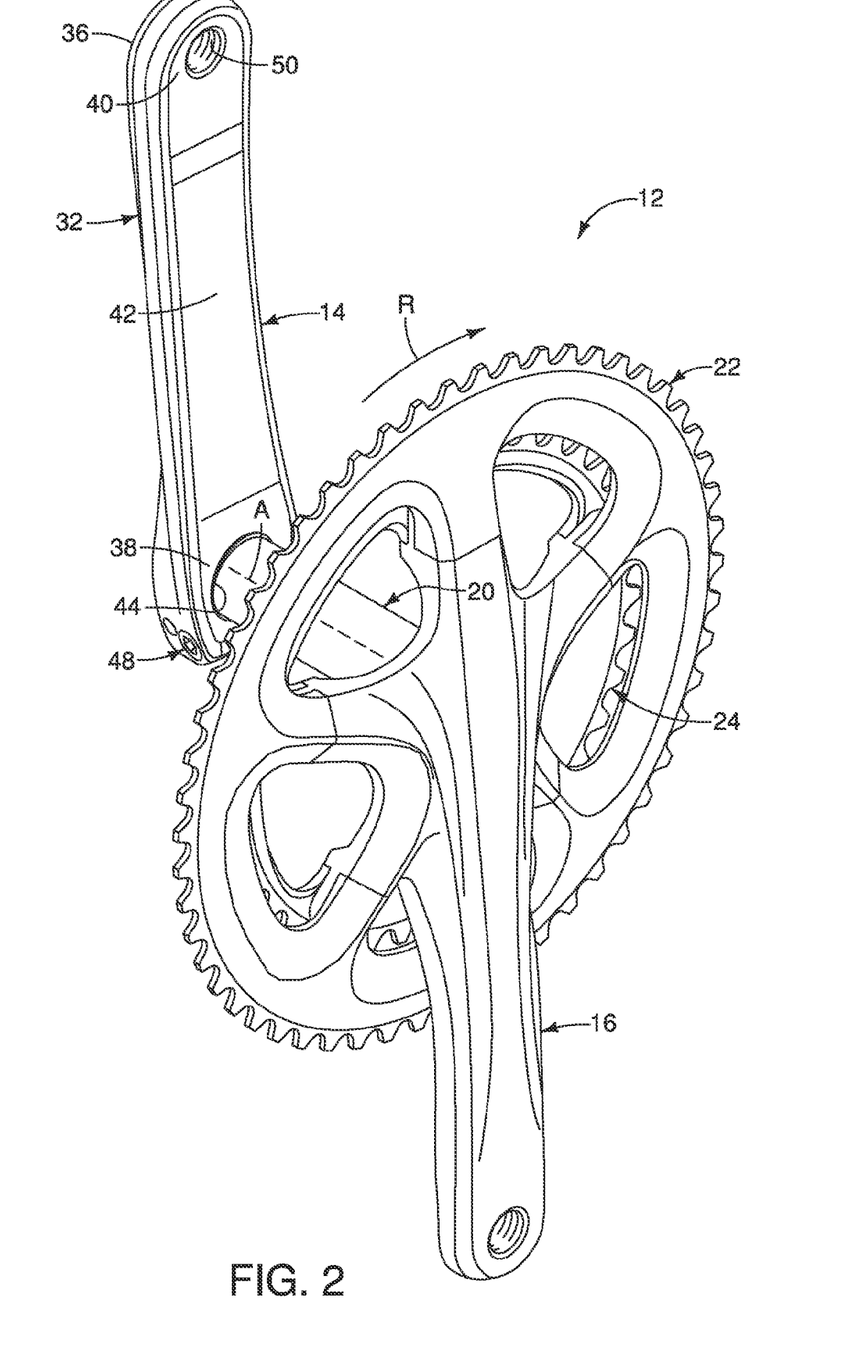
FIG. 2 is an assembled perspective view of the bicycle crank assembly illustrated in FIG. 1.

As illustrated in FIG. 2, the bicycle crank axle assembly 12 further includes a crank axle 20. The first and second crank arms 14 and 16 are fixedly coupled to the crank axle 20 such that the first and second crank arms 14 and 16 extend perpendicularly from the crank axle 20 in opposite directions. In the illustrated embodiment, the first crank arm 14 is attached to a first end of the crank axle 20 in a releasable and reinstallable manner. The second crank arm 16 is attached to a second end of the crank axle 20 in a conventional manner (e.g., crimping, locking ring, adhesive, etc.). In the first illustrated embodiment, the second crank arm 16 has a pair of sprockets 22 and 24. The sprockets 22 and 24 are fixedly mounted to the second crank arm 16 in a conventional manner (e.g., ring nuts and ring bolts). As seen in FIG. 2, the longitudinal center of the crank axle 16 defines a rotational axis A of the bicycle crank axle assembly 12.

Referring now to FIGS. 3 to 6, the first crank arm 14 will now be discussed in more detail. The first crank arm 14 is provided with an internal pedaling force sensing arrangement 30. While the internal pedaling force sensing arrangement 30 is illustrated as being installed in the first crank arm 14, it will be apparent from this disclosure that the internal pedaling force sensing arrangement 30 can be installed in a right crank arm such as the second crank arm 16. In other words, it will be apparent from this disclosure that the internal pedaling force sensing arrangement 30 can be installed ether one of the first and second crank arms 14 and 16, or both as needed and/or desired.

Figure 3:
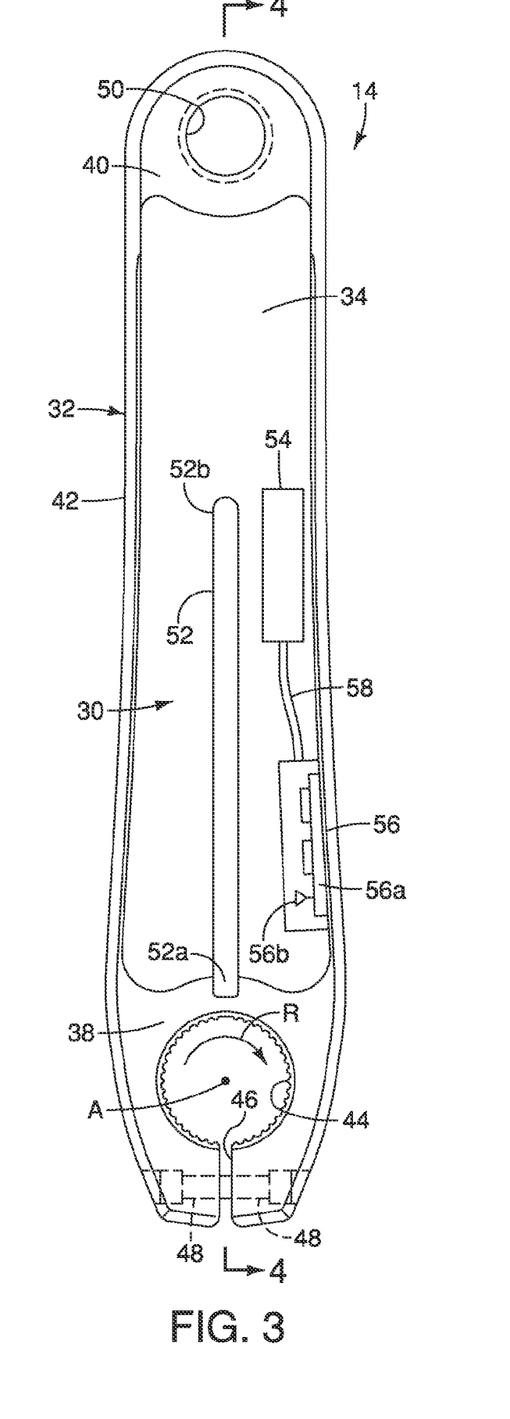
FIG. 3 is an outside elevational view of the left bicycle crank arm illustrated in FIGS. 1 and 2 with the cover removed to illustrated the internal pedaling force sensing arrangement of the left bicycle crank arm.
Figure 4:
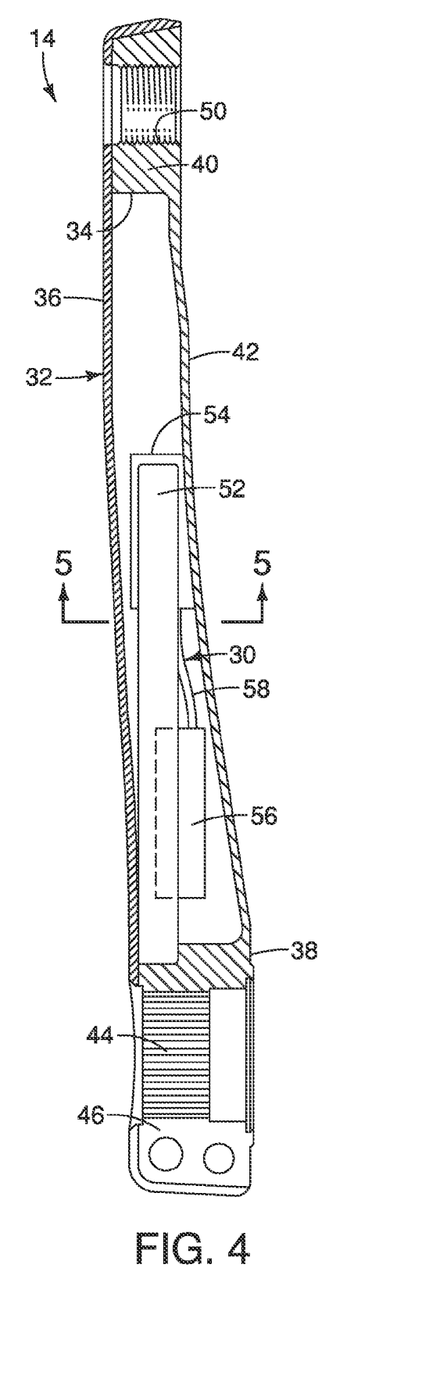
FIG. 4 is a longitudinal cross sectional view of the left bicycle crank arm illustrated in FIGS. 1 to 3 as seen along section line 4-4 of FIG. 3.
Figure 5:
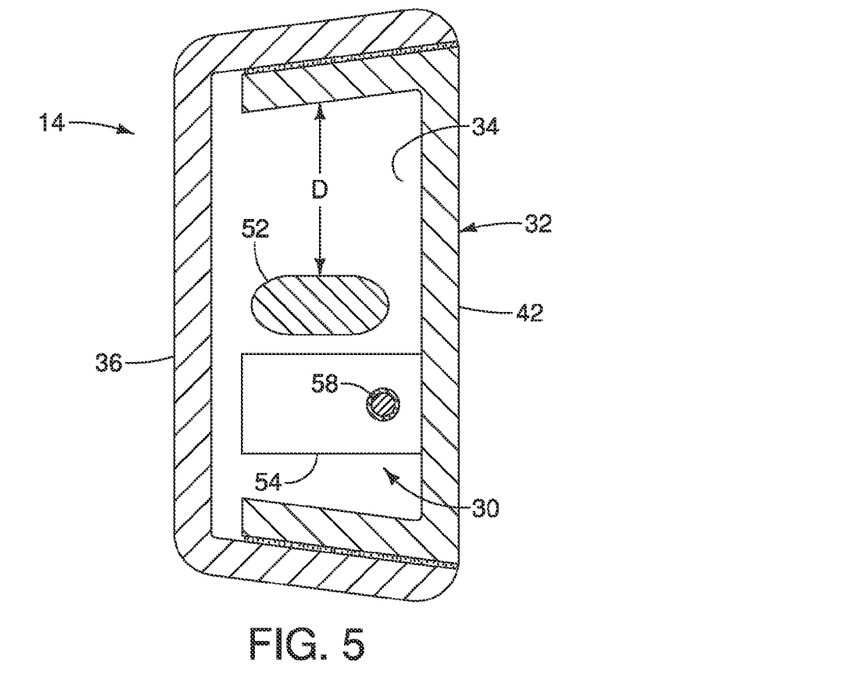
FIG. 5 is a simplified transverse cross sectional view of the left bicycle crank arm as seen along section line 5-5 of FIG. 4.

Basically, the first crank arm 14 includes a crank body 32 that supports the internal pedaling force sensing arrangement 30. In the first illustrated embodiment, the crank body 32 includes a recess or cavity 34 that receives the internal pedaling force sensing arrangement 30. Preferably, a cover member 36 is fixedly coupled to the crank body 32 to cover the opening of the cavity 34 and to conceal the internal pedaling force sensing arrangement 30. However, it will be apparent from this disclosure that the cover member 36 is not necessary. For example, the cavity 34 could be formed so as to open on the side of the crank body 32 that faces the bicycle frame so that the internal pedaling force sensing arrangement 30 is hidden from view when installed on the bicycle 10.

The crank body 32 further includes a crank axle mounting portion 38, a pedal mounting portion 40 and an arm portion 42. The cavity 34 is formed in the arm portion 42 that is located between the crank axle mounting portion 38 and the pedal mounting portion 40. The arm portion 42 constitutes a base member of the crank body 32. The cover member 36 is fixedly attached to the arm portion 42 (i.e., the base member) to substantially enclose the cavity 34.

In the first illustrated embodiment, the crank axle mounting portion 38, the pedal mounting portion 40 and the arm portion 42 are integrally formed as a one-piece, unitary member of a metallic material that is typically used in manufacturing crank arms. However, the crank body 32 can be formed of a non-metallic material such as a fiber reinforced material (e.g., a carbon fiber material).

While the crank body 32 is generally a very rigid member, the crank body 32 undergoes a slight amount of resilient flexing while a rider is pedaling. In other words, the arm portion 42 of the crank body 32 is elastically deformed upon application of a pedaling force being applied to the pedal mounting portion 40 via the bicycle pedals 18 while a rider is pedaling. Thus, the crank body 32 is elastically deformable upon application of a pedaling force.

The crank axle mounting portion 38 has a splined bore 44 and a slot 46 that extends from the periphery of the splined bore 44. The effective diameter of the splined bore 44 is adjusted using a pair of bolts 48 in a conventional manner. The pedal mounting portion 40 has a threaded bore 50 for fixedly attaching one of the bicycle pedals 18. In the case of a left crank arm, the thread of the threaded bore 50 is a left-hand thread for attaching the left bicycle pedal. On the other hand, in the case of a right crank arm, a right-hand thread is typically used for attaching the right bicycle pedal.

The internal pedaling force sensing arrangement 30 will now be discussed in more detail. The internal pedaling force sensing arrangement 30 basically includes a reference member 52 and a sensor 54. The reference member 52 is a beam that is fixedly attached to the crank body 32. The sensor 54 is fixedly attached to the crank body 32 in this first embodiment. The cavity 34 of the crank body 32 contains both the reference member 52 and the sensor 54. The sensor 54 is arranged to output a signal based on change in a distance D between the crank body 32 and the reference member 52 as seen in FIG. 6.

Referring to FIGS. 3 and 4, the reference member 52 has a fixed end portion 52a and a free end portion 52b. The fixed end portion 52a of the reference member 52 is fixed to the crank axle mounting portion 38 of the crank body 32. The reference member 52 extends from the crank axle mounting portion 38 of the crank body 32 towards the pedal mounting portion 40 in a cantilever arrangement. The free end portion 52b of the reference member 52 is located closer to the pedal mounting portion 40 than to the crank axle mounting portion 38. While the crank body 32 and the reference member 52 are separate in the first illustrated embodiment, the crank body 32 and the reference member 52 can be formed as a one-piece, unitary member.

The sensor 54 is disposed between the crank body 32 and the reference member 52 on a side of the reference member 52 that faces in a rotational direction R (as indicated in FIGS. 2 and 3) of the first crank arm 14. Preferably, the sensor 54 is disposed adjacent the free end portion 52b of the reference member 52. However, while only a single sensor is used in the illustrated embodiment, additional sensors can be used as needed and/or desired. For example, two sensors can be used with one disposed on each side of the reference member 52 with respect to the rotational direction R of the crank arm 14. In with this alternative structure using two sensors, the differential output value from each sensor is larger than using one only one sensor, and thus it is easier to detect the slight difference in the distance D while a rider is pedaling the crank assembly 12.

Figure 6:
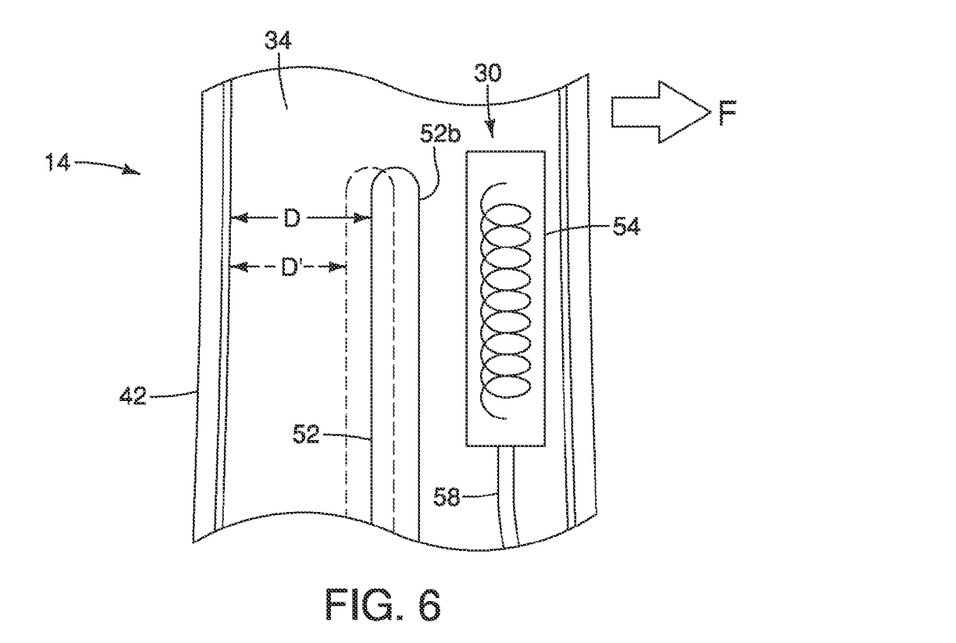
FIG. 6 is an enlarged elevational view of a portion of the left bicycle crank arm to illustrated movement (exaggerated for purposes of illustration) of a free end portion of the reference member relative to a coil sensor.

As illustrated in FIG. 6, while a rider is pedaling the crank assembly 12, the crank body 32 will undergo a slight amount of resilient flexing due to the application of a pedaling force F in the direction of rotation. In other words, when the rider rotates the crank assembly 12, the crank arm 14 will slightly bend based on the pedaling force F from the rider. In this way, the arm portion 42 of the crank body 32 will elastically deformed such that the pedal mounting portion 40 will deflect relative to the crank axle mounting portion 38. Thus, the distance D between the side of the crank body 32 and the free end portion 52b of the reference member 52 will be changed. In particular, this deflection of the pedal mounting portion 40 relative to the crank axle mounting portion 38 will result in the distance D between the crank body 32 and the reference member 52 to increase to a distance D'. The value of the distance D' will depend on the pedaling force F applied to the pedal mounting portion 40.

In the first embodiment, the sensor 54 is a coil sensor, which detects changes in eddy current in order to detect when the distance D between the crank body 32 and the reference member 52 changes to the distance D'. Thus, an output signal of the coil sensor 54 is changed as the relative distance between the free end portion 52b of the reference member 52 and the coil of the coil sensor 54 that is mounted to the crank body 32. As illustrated in FIG. 6, the coil sensor 54 is provided for detecting movement (exaggerated in FIG. 6 for purposes of illustration) of the free end portion 52b of the reference member 52 relative to the crank body 32 of the first crank arm 14. Since coil sensors such as the coil sensor 54 are well known (e.g., Japanese Laid-Open Patent Publication No. 2009-192385), the coil sensor 54 will not be discussed in detail herein.

In the first embodiment, the internal pedaling force sensing arrangement 30 further includes a communication unit 56 that is mounted in the cavity 34 of the arm portion 42 of the crank body 32. The communication unit 56 is operatively connected to the sensor 54 by an electrical wire 58 to receive a signal from the sensor 54 and outputs information based on the signal from the sensor 54. Preferably, the communication unit 56 includes a microprocessor 56a. The microprocessor 56a is programmed to calculate force or power applied to the first crank arm 14 in a well-known manner based on the signals received from sensor 54. Preferably, the communication unit 56 further includes a wireless transmitter 56b so that the communication unit 56 wirelessly transmits information to one or more electrical bicycle components. In other words, the wireless transmitter 56b transmits sensor signals of the sensor 54 and/or calculated data wirelessly.

As seen in FIG. 1, the bicycle 10 is equipped with a cycle computer 60, an electronic front derailleur 62 and an electronic rear derailleur 64. The wireless transmitter 56b transmits sensor signals of the sensor 54 and/or calculated data wirelessly to the cycle computer 60. The wireless transmitter 56b can also transmit information from the communication unit 56 to one or both of the electronic derailleurs 62 and 64 as needed and/or desired. Alternatively, the communication unit 56 can be operatively connected to one or more of the cycle computer 60, the electronic front derailleur 62 and the electronic rear derailleur 64 by one or more electrical cords.

Figure 7:
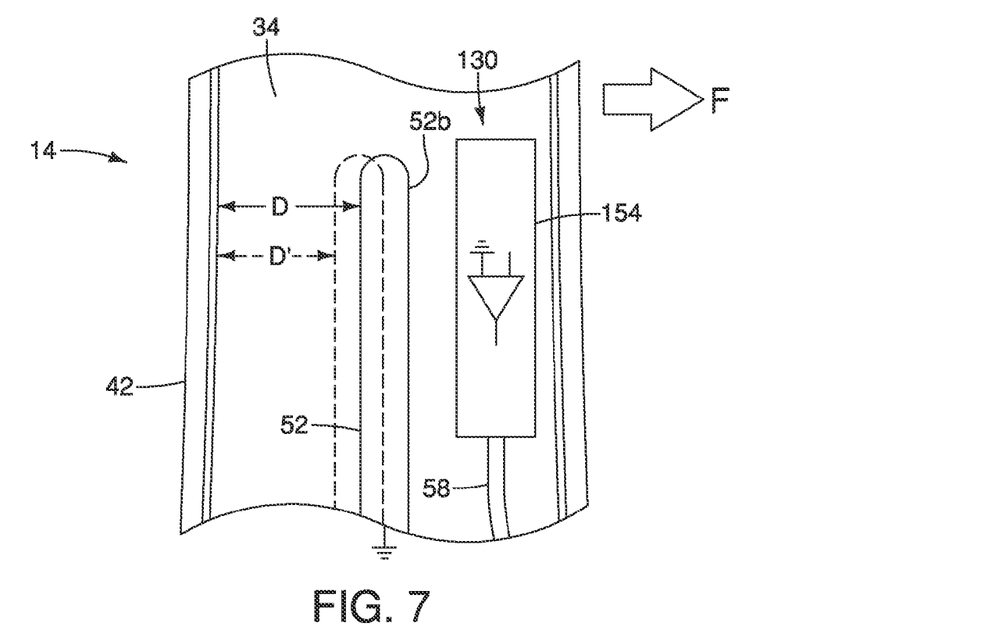
FIG. 7 is an enlarged elevational view of a portion of the left bicycle crank arm to illustrated movement (exaggerated for purposes of illustration) of the free end portion of the reference member relative to the crank body and wherein a capacitor sensor is used in place of the coil sensor of the first embodiment.

Referring now to FIG. 7, an internal pedaling force sensing arrangement 130 will now be explained in accordance with a second embodiment. Basically, the internal pedaling force sensing arrangement 130 replaces the internal pedaling force sensing arrangement 30 and is installed in either one or both of the first and second crank arms 14 and 16. In other words, while the internal pedaling force sensing arrangement 130 is illustrated as being installed in the first crank arm 14, it will be apparent from this disclosure that the internal pedaling force sensing arrangement 130 can be installed in a right crank arm such as the second crank arm 16.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the internal pedaling force sensing arrangement 130 is the same as the internal pedaling force sensing arrangement 30, but a capacitor sensor 154 is used for detecting movement (exaggerated in FIG. 7 for purposes of illustration) of the free end portion 52b of the reference member 52 relative to the crank body 32 of the first crank arm 14. In particular, the capacitor sensor 154 detects changes in capacitance in order to detect when the distance D between the crank body 32 and the reference member 52 changes to the distance D'. Thus, an output signal of the capacitor sensor 154 is changed as the relative distance between the free end portion 52b of the reference member 52 and the capacitor of the capacitor sensor 154 that is mounted to the crank body 32. Since capacitor sensors such as the capacitor sensor 154 are well known, the capacitor sensor 154 will not be discussed in detail herein.

Figure 8:
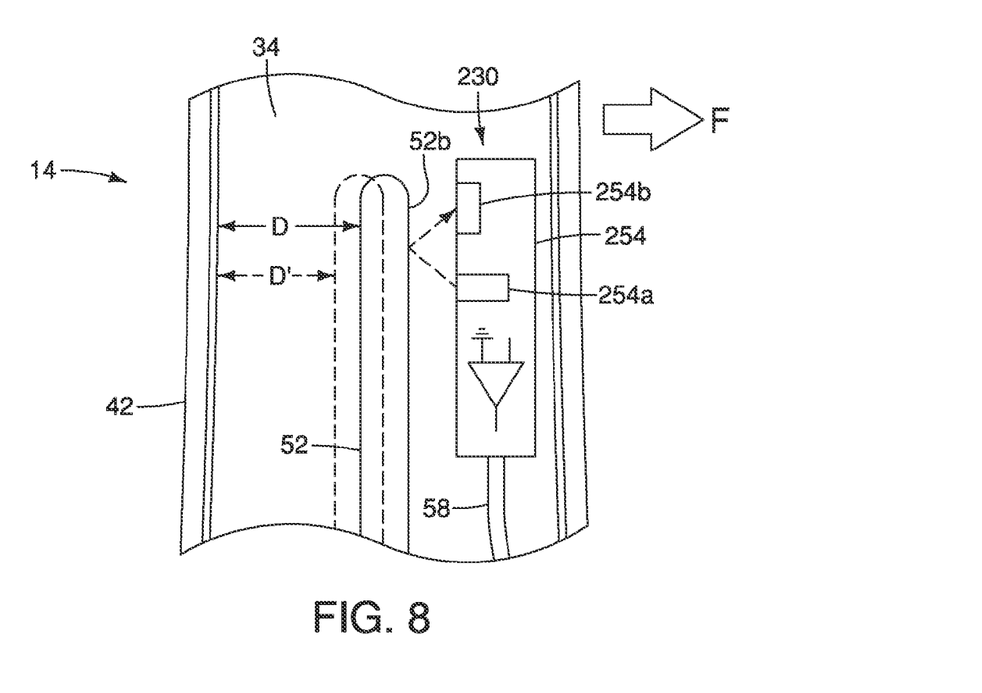
FIG. 8 is an enlarged elevational view of a portion of the left bicycle crank arm to illustrated movement (exaggerated for purposes of illustration) of the free end portion of the reference member relative to the crank body and wherein an optical sensor that includes a laser device and a light receiver is used in place of the coil sensor of the first embodiment.

Referring now to FIG. 8, an internal pedaling force sensing arrangement 230 will now be explained in accordance with a third embodiment. Basically, the internal pedaling force sensing arrangement 230 replaces the internal pedaling force sensing arrangement 30, and is installed in either one or both of the first and second crank arms 14 and 16. In other words, while the internal pedaling force sensing arrangement 230 is illustrated as being installed in the first crank arm 14, it will be apparent from this disclosure that the internal pedaling force sensing arrangement 230 can be installed in a right crank arm such as the second crank arm 16.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the internal pedaling force sensing arrangement 230 is the same as the internal pedaling force sensing arrangement 30, but an optical sensor 254 is used for detecting movement (exaggerated in FIG. 8 for purposes of illustration) of the free end portion 52b of the reference member 52 relative to the crank body 32 of the first crank arm 14. In particular, the optical sensor 254 includes a laser device 254a and a light receiver 254b. The optical sensor 254 detects movement of the free end portion 52b of the reference member 52 relative to the crank body 32 of the first crank arm 14 by reflexing the light of the laser device 254a off of the free end portion 52b to the light receiver 254b, and then measuring the reflection action time and/or quantity of light that has changed when the distance D is changed. Thus, an output signal of the optical sensor 254 is changed as the relative distance between the free end portion 52b of the reference member 52 and the optical sensor 254 that is mounted to the crank body 32. Since optical sensors such as the optical sensor 254 are well known, the optical sensor 254 will not be discussed in detail herein.

Figure 9:
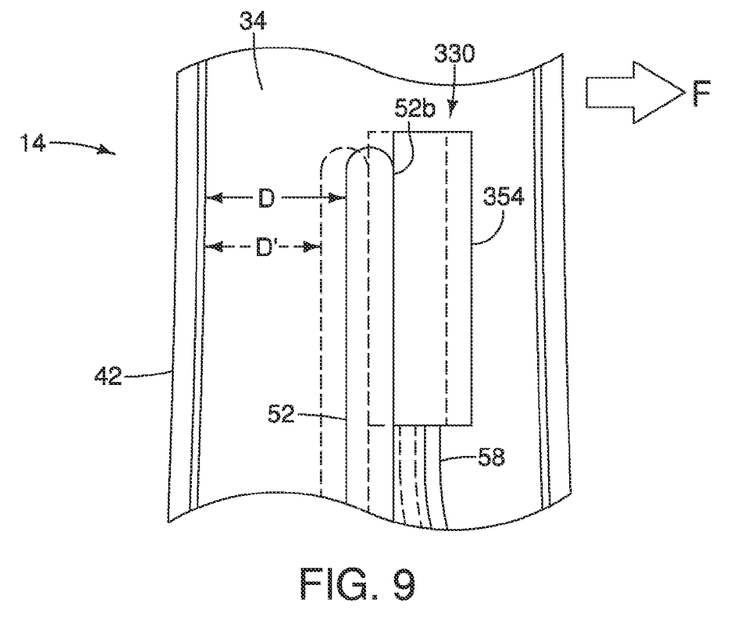
FIG. 9 is an enlarged elevational view of a portion of the left bicycle crank arm to illustrated movement (exaggerated for purposes of illustration) of the free end portion of the reference member relative to the crank body and wherein a sensor is mounted on the free end portion of the reference member.

Referring now to FIG. 9, an internal pedaling force sensing arrangement 330 will now be explained in accordance with a fourth embodiment. Basically, the internal pedaling force sensing arrangement 330 replaces the internal pedaling force sensing arrangement 30, and is installed in either one or both of the first and second crank arms 14 and 16. In other words, while the internal pedaling force sensing arrangement 330 is illustrated as being installed in the first crank arm 14, it will be apparent from this disclosure that the internal pedaling force sensing arrangement 330 can be installed in a right crank arm such as the second crank arm 16.

In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the internal pedaling force sensing arrangement 330 is the same as the internal pedaling force sensing arrangement 30, but a sensor 354 is mounted on the free end portion 52b of the reference member 52 for detecting movement (exaggerated in FIG. 9 for purposes of illustration) of the free end portion 52b of the reference member 52 relative to the crank body 32 of the first crank arm 14. The sensor 354 can be a coil sensor, a capacitor sensor or an optical sensor. In any case, the sensor 354 detects movement of the free end portion 52b of the reference member 52 relative to the crank body 32 of the first crank arm 14. Thus, an output signal of the sensor 354 is changed as the relative distance between the free end portion 52b of the reference member 52 and the crank body 32.

Figure 10:
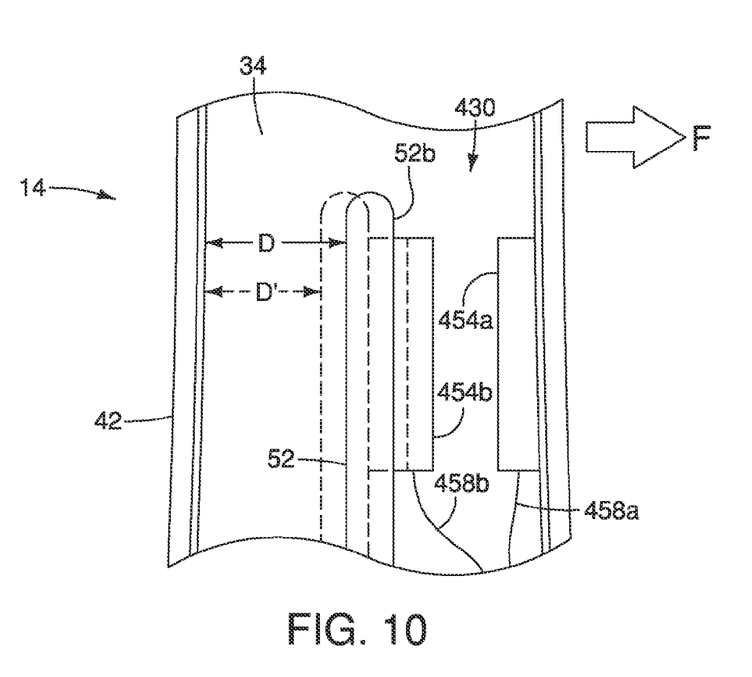
FIG. 10 is an enlarged elevational view of a portion of the left bicycle crank arm to illustrated movement (exaggerated for purposes of illustration) of the free end portion of the reference member relative to the crank body and wherein a first sensor part is mounted on the free end portion of the reference member and a second sensor part is mounted on the crank body.

Referring now to FIG. 10, an internal pedaling force sensing arrangement 430 will now be explained in accordance with a fifth embodiment. Basically, the internal pedaling force sensing arrangement 430 replaces the internal pedaling force sensing arrangement 30, and is installed in either one or both of the first and second crank arms 14 and 16. In other words, while the internal pedaling force sensing arrangement 430 is illustrated as being installed in the first crank arm 14, it will be apparent from this disclosure that the internal pedaling force sensing arrangement 430 can be installed in a right crank arm such as the second crank arm 16.

In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the internal pedaling force sensing arrangement 430 is the same as the internal pedaling force sensing arrangement 30, but a first sensor part 454a is mounted on the free end portion 52b of the reference member 52 and a second sensor part 454b is mounted on the crank body 32 for detecting movement (exaggerated in FIG. 10 for purposes of illustration) of the free end portion 52b of the reference member 52 relative to the crank body 32 of the first crank arm 14. The first and sensor parts 454a and 454b can be any type of sensor arrangement that detects movement of the free end portion 52b of the reference member 52 relative to the crank body 32 of the first crank arm 14. Thus, an output signal of one or both of the first and sensor parts 454a and 454b is changed as the relative distance between the free end portion 52b of the reference member 52 and the crank body 32 and sent to the communication unit 56 via electrical cords 458a and 458b. Preferably, the first and sensor parts 454a and 454b form a sensor that is disposed on both the crank body 32 and the reference member 52 in an area between the crank body 32 and the reference member 52 that is located on a side of the reference member 52 that faces in the rotational direction R of the crank arm 14.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle crank arm. Accordingly, these terms, as utilized to describe the bicycle crank arm should be interpreted relative to a bicycle equipped with the bicycle crank arm as used in the upright riding position on a horizontal surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank arm comprising:
   a crank body having a crank axle mounting portion and a pedal mounting portion;
   a reference member attached to the crank body; and
   a sensor attached to at least one of the crank body and the reference member, the sensor being arranged to output a signal based on a distance between the crank body and the reference member.

2. The bicycle crank arm according to claim 1, wherein the crank body is deformable upon application of a pedaling force being applied to the pedal mounting portion.

3. The bicycle crank arm according to claim 1, wherein the reference member has a free end portion and a fixed end portion that is fixed to the crank body.

4. The bicycle crank arm according to claim 3, wherein the fixed end portion of the reference member is fixed to the crank axle mounting portion of the crank body and the reference member extends from the crank axle mounting portion of the crank body towards the pedal mounting portion.

5. The bicycle crank arm according to claim 4, wherein the free end portion of the reference member is located closer to the pedal mounting portion than to the crank axle mounting portion.

6. The bicycle crank arm according to claim 1, wherein the sensor is disposed between the crank body and the reference member on a side of the reference member that faces in a rotational direction of the crank arm.

7. The bicycle crank arm according to claim 1, wherein the sensor is disposed on both the crank body and the reference member in an area between the crank body and the reference member that is located on a side of the reference member that faces in a rotational direction of the crank arm.

8. The bicycle crank arm according to claim 1, wherein the sensor is disposed on a free end portion of the reference member.

9. The bicycle crank arm according to claim 1, wherein the sensor is disposed on a portion of the crank body which is opposed to a free end portion of the reference member.

10. The bicycle crank arm according to claim 1, wherein the crank body includes a cavity that contains the reference member and the sensor.

11. The bicycle crank arm according to claim 10, wherein the crank body includes a base member and a cover member attached to the base member to substantially enclose the cavity.

12. The bicycle crank arm according to claim 1, wherein the sensor is a coil sensor.

13. The bicycle crank arm according to claim 1, wherein the sensor is a capacitor sensor.

14. The bicycle crank arm according to claim 1, wherein the sensor is an optical sensor that includes a laser device and a light receiver.

15. The bicycle crank arm according to claim 1, further comprises
a communication unit operatively connected to the sensor to receive a signal from the sensor and outputs information based on the signal from the sensor.

16. The bicycle crank arm according to claim 15, wherein the communication unit wirelessly transmits information.

17. The bicycle crank arm according to claim 1, wherein the reference member is a beam attached to the crank body.

* * * * *